United States Patent [19]

Spence

[11] Patent Number: 5,599,035
[45] Date of Patent: Feb. 4, 1997

[54] AUTOMATIC BOAT TO TRAILER LATCH

[76] Inventor: Wendell L. Spence, P.O. Box 1034, East Jordan, Mich. 49727

[21] Appl. No.: 233,688

[22] Filed: Apr. 26, 1994

[51] Int. Cl.⁶ ................ B60P 3/10; B60P 7/06
[52] U.S. Cl. ............ 280/414.1; 280/508; 410/77
[58] Field of Search .................. 410/69, 77, 81, 410/2, 44, 7; 280/414.1, 508; 202/341.15, 335; 114/344; 414/396, 584, 401, 529–536

[56] References Cited

U.S. PATENT DOCUMENTS

| | | | |
|---|---|---|---|
| 2,478,736 | 8/1949 | Balzer | 280/33.15 |
| 3,161,422 | 12/1964 | Wade | 280/508 |
| 3,750,805 | 8/1973 | Finney . | |
| 3,912,302 | 10/1975 | Patterson | 280/477 |
| 3,938,829 | 2/1976 | Anderson | 280/414.1 |
| 3,963,263 | 6/1976 | Whitlock | 280/414.1 |
| 3,989,267 | 11/1976 | Robinson | 280/414 R |
| 4,114,920 | 9/1978 | Boettcher | 280/414 R |
| 4,339,148 | 7/1982 | Smith et al. | 410/77 X |
| 4,463,965 | 8/1984 | Lawson | 280/414.1 |
| 4,641,851 | 2/1987 | Knies | 280/414.1 |
| 5,000,471 | 3/1991 | Sumrall | 280/414.1 |
| 5,120,079 | 6/1992 | Boggs | 280/414.1 |
| 5,193,835 | 3/1993 | Sheets | 280/414.1 |
| 5,387,070 | 2/1995 | Roeling | 280/508 X |
| 5,413,369 | 5/1995 | Trent | 280/508 X |

Primary Examiner—James W. Keenan
Assistant Examiner—Stephen Gordon
Attorney, Agent, or Firm—Douglas S. Bishop

[57] ABSTRACT

An automatic boat to trailer latching device. The invention is designed primarily to facilitate one person boat to trailer recovery operations, particularly in less than ideal conditions, such as choppy water surface, cross winds, and after dark or predawn recoveries. The invention allows operation of the boat to trailer latching mechanism without requiring constant vertical alignment of the boat and trailer, without requiring longitudinal alignment of the boat and trailer during the approach and permits one person to complete the operation either in the boat, or behind the boat, in daylight, or darkness, in positions where the actual latch mechanism cannot be visually observed. The invention is a boat to host trailer latch assembly generally comprised of an elongated vertically extended latch bar adapted to be secured to the prow of a boat and a latch structure adapted to mounted on the forward end of a boat trailer. The latch bar is guided into the latch structure by a funnel mechanism and entry of the latch bar into the latch structure, by means of contacting a lever, causes the latch mechanism to operate automatically, by releasing a latch bolt which is biased into the latching position and holds the latch bar and place it within the latch structure. The invention additionally includes a flag and light structure for visually locating the latch structure when recovering a boat, and for indicating when a successful latching operation has been completed.

8 Claims, 4 Drawing Sheets

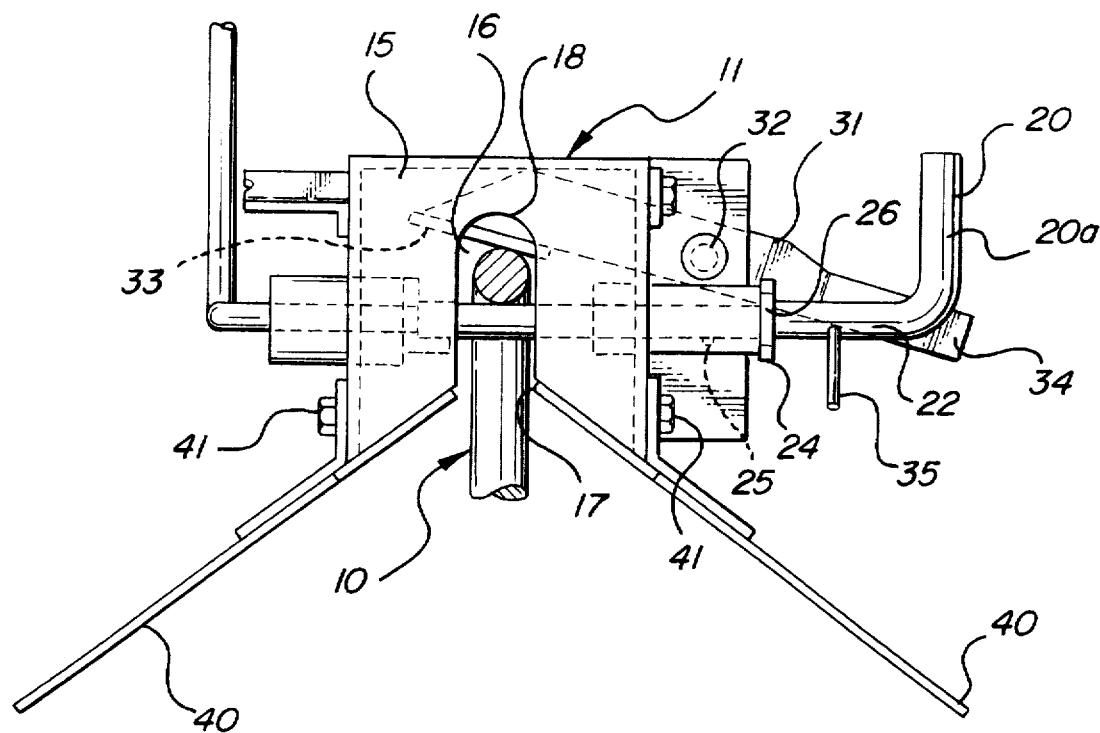
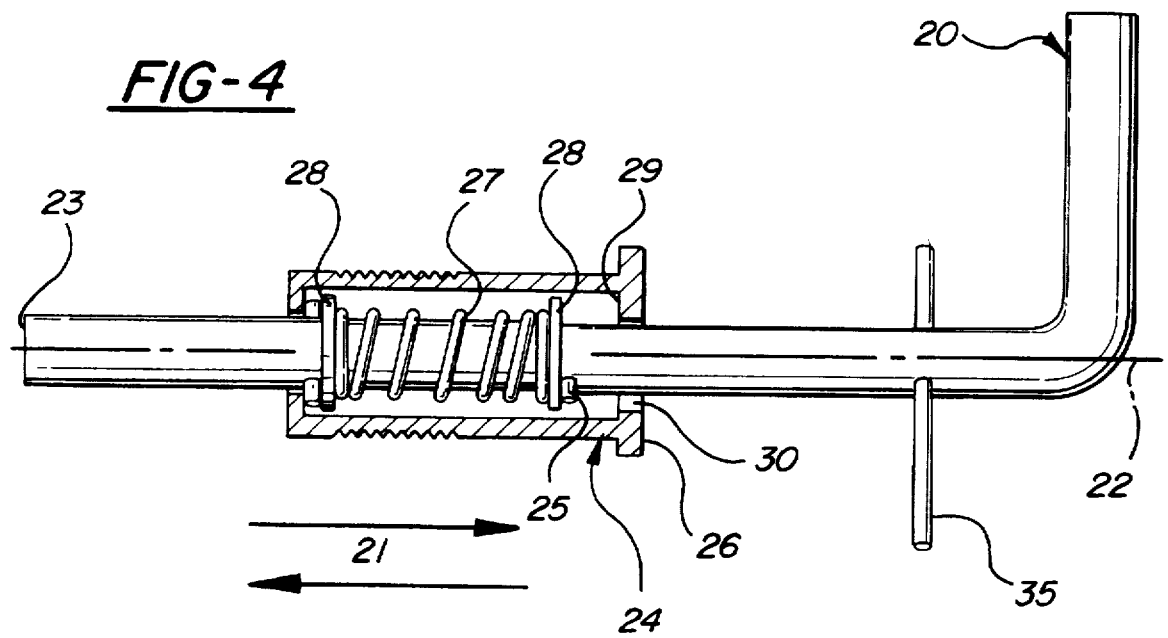

AUTOMATIC BOAT TO TRAILER LATCH

BACKGROUND OF THE INVENTION

This invention relates to boat trailers, and more specifically to an automatic latching mechanism for attaching and holding a trailered boat to the receiving trailer.

One of the frequent difficulties encountered in trailering a boat is the necessity of assistance in aligning the boat to the trailer, and once so aligned, in affixing it to the trailer so that it may be removed from the water with the trailer.

Trailered boats, in general, are launched and recovered by utilizing a towing vehicle and submerging the trailer in water to a point where the boat may, in launching, be freely floated from the trailer when the latching device holding the boat to the trailer is released, and, conversely, upon recovery, the boat may be floated onto the trailer, held in place by an appropriate latching device, and, so secured, removed with the trailer from the water by the towing vehicle.

While apparently simple in concept, the recovery process becomes significantly more difficult when wind and water conditions are less then ideal. Recovery of a boat utilizing a trailer on a calm water surface, with no wind, in daylight and with assistance of others, may be accomplished quite easily with most available boat to trailer latching mechanisms, automatic or not.

Choppy water surfaces, cross-winds and night recovery situations, however, make recovery of a trailered boat a much more tenuous task, particularly when assistance is not readily available.

Various devices are available which ostensibly permit one person boat recovery operations, by providing some type of self-activating locking mechanism. However, for the most part, they presume conditions where, if assistance is not available, conditions will readily permit one person to align the boat, move it over the trailer and, in so doing, activate the locking mechanism. Available devices do not facilitate one-person recovery operations in less than ideal conditions.

Specifically, an optimal automatic boat to trailer latch must permit one-person operation, where water surface disturbance causes pitching which prevents point to point vertical alignment of the boat being recovered and the trailer for any significant period of time.

An optimal automatic boat to trailer latch must permit one person operation under cross wind conditions which prevent longitudinal alignment of the boat being recovered and the trailer during the boat's approach over the trailer.

An optimal automatic boat to trailer latch must permit one-person operation by a person either in the boat or in the water behind it in light or in darkness, by allowing that person to align the boat's bow with the latching mechanism and to observe when the latching operation is complete, without sacrificing control of the boat.

In many instances, sportsmen, recreational boaters, or commercial operators of small trailered boats must recover their craft without assistance. Recovery is often after dark or before dawn. Further, recovery, unlike launch, cannot wait for ideal water and weather conditions.

As noted, existing self-activating locking mechanisms for affixing boats to trailers do not satisfy the above requirements.

SUMMARY OF THE INVENTION

This invention is directed to the provision of an automatic boat to trailer latch which will permit one-person recovery operations not dependent upon ideal conditions.

More specifically, this invention is directed to the provision of an automatic boat-to-trailer latch that is especially designed to allow the automatic latch mechanism to operate in water-surface conditions where point to point vertical alignment of the boat being recovered and the recovery trailer is difficult or impossible to maintain for any significant period of time.

A more specific object is to provide an automatic boat to trailer latch which permits recovery operations in cross wind conditions, by providing a guidance mechanism which permits the latch to operate without requiring precise longitudinal alignment of the boat being recovered and the trailer during all stages of recovery, including the boat's approach to and over the trailer.

An additional specific object of the invention is to provide an automatic boat to trailer latch which provides a visual means for a single person operator to guide the boat being recovered into the latching mechanism of the trailer, and a visual means for such a single person operator to determine that latching has been accomplished.

The latch assembly of the present invention is of the type including a latch bar adapted to be secured to the prow of the boat. According to an important feature of the invention, this includes an elongated generally vertically extending latch bar portion spaced forwardly of the prow. This configuration allows operation in choppy surfaces when the prow of the boat is pitching by providing an extended, elongated latch bar, which provides a substantial range of vertical prow positions in which the latching/recovery operation may be completed. Such a configuration additionally facilitates utilization in cross wind situations, by providing an extended, elongated contact surface for guiding the latch bar into latching position. The forwardly spacing of the latch bar from the prow also provides a greater margin for error in aligning the boat for the recovery operation.

According to a further feature of the invention, the latch assembly includes a latch structure adapted to be mounted on the forward end of the boat trailer, which further includes a housing defining a vertically extending slot opening in the rear, upper, and lower faces of the housing and sized to receive the latch bar portion therein. This arrangement ensures proper vertical alignment of the boat relative to the trailer upon latching because of the required vertical alignment of the latch bar and latch structure. Essentially, the latch bar functions as male member and the latch structure as female member of the entire latch assembly.

According, to a further feature of the invention, the latch structure further includes a bolt having a tip end and a handle end, together with a means for mounting the bolt on the latch structure housing so that the bolt may move horizontally along its lengthwise axis between a retracted position in which the tip end is clear of the slot and a latching, or latched, position in which the tip end extends across the slot. This arrangement allows the boat to be latched to the trailer by moving the bolt into the latching position rearwardly of the male latch bar member after the male latch bar member has entered the female latch structure.

According to a further feature of the invention, a means is provided for mounting the bolt on the housing structures for rotational movement about its lengthwise axis between a first angular position in which the bolt is prevented from moving to its latched position. A means is further provided to retain the bolt in its second angular position and a means in the way of a spring or otherwise is provided biasing the bolt toward its latching position. A lever is pivotally mounted on the housing. The lever includes a first end, positioned in the slot proximate the bolt in a position which it is engaged by the latch bar male member to pivot the lever, and a second end positioned proximate the handle end of the bolt.

According to a further feature of the invention, the lever is mounted for movement about a generally vertical axis and a means is provided operative in response to pivotal movement of the lever to move the bolt to its first angular position and to allow the bolt to move to its latching position under the urging of the biasing means. The means operative to move the bolt to its first operative position in response to pivotal movement of the lever may compose a crank arm extending radially from the handle end of the bolt and engaged by the second end of the lever.

Those additional features allow the latch mechanism to operate automatically upon contact with the first end of the lever by the vertically extending male latch bar member, securing the boat to the trailer.

According to a further feature of the invention, the latch structure further includes funnel means extending rearwardly from said slot and operative to direct the latch bar portion into the slot. The vertical extent of the latch bar portion is at least as great as the vertical extent of the slot. The funnel means may comprise ramp plates extending rearwardly from the entrance of said slot and diverging rearwardly so as to provide a wide mouth target for the male latch bar portion. This arrangement facilitates recovery operations in cross winds or other situations where longitudinal alignment of the boat or trailer is difficult or impossible to maintain during the entire approach and recovery process. The funnel means contacts the male vertically extending latch member and guides the latch member to the female vertical slot.

According to a further feature of the invention, the latch structure includes a flag structure mounted on the housing for movement between an operative position in which a flag portion of the flag structure extends above the housing in vertical alignment with the vertical slot to provide a visual locator for the slot, and a retracted position. The flag structure includes a shaft portion mounted on the housing for movement along a horizontal axis aligned with the lengthwise axis of the bolt. It is positioned with an inboard free end placed in a confronting relationship to an inboard free end of the bolt. The flag shaft portion being arranged to be struck by the bolt upon movement of the bolt to its latching position and the striking of the flag structure shaft portion being operative to move the flag structure to its retracted position. The flag structure also includes a light positioned on the free end of the flag structure so as to provide a light position over and in alignment with the slot with the flag structure in its operative position. This arrangement allows a single person operator in the boat or behind the boat to visually align the prow of the boat with the vertical slot of the housing and the light feature allows such visual alignment in darkness, as well.

BRIEF DESCRIPTION OF THE DRAWINGS

FIG. 3 is a top cross-sectional, partially cut-away view of the component parts of the invention as shown in FIG. 2, with the lever, bolt and male latch member in the latching position;

FIG. 4 is partially cut-away side view of the latching bolt mechanism and biasing means.

DETAILED DESCRIPTION OF THE PREFERRED EMBODIMENT

Figure 1:
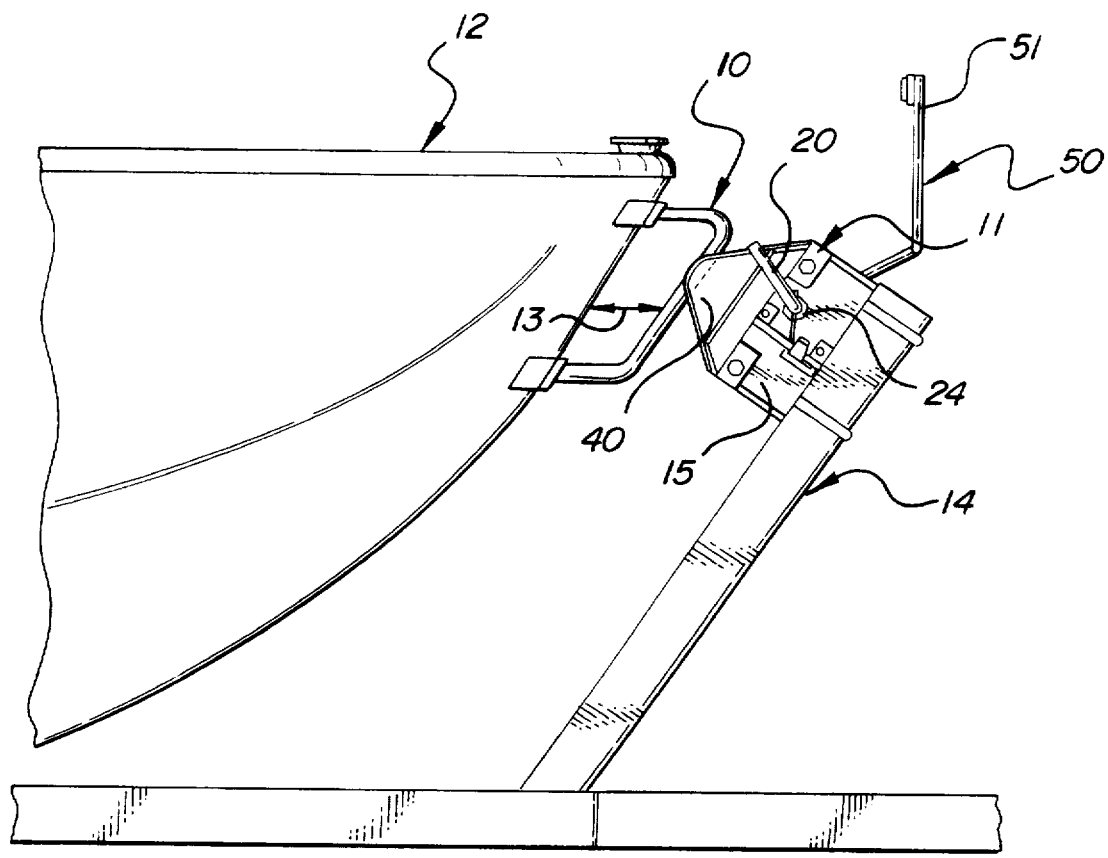
FIG. 1 is a side elevational view of an automatic boat to trailer latch, mounted on a boat and trailer according to the invention.

The invention latch assembly, broadly considered, includes a latch bar 10 and a latch structure 11.

Latch bar 10 is adapted to be secured to the prow of the boat 12. It is spaced forwardly 13 from the prow of the boat 12 and is elongated and generally vertically extending.

Latch structure 11 is adapted to be mounted on the forward end of the boat trailer 14. Latch structure 11 includes a housing 15 defining a vertically extending slot opening 16 in the rear 17, upper 18, and lower 19 faces of the housing and sized to receive the latch bar portion 10 in said slot opening 16.

Figure 2:
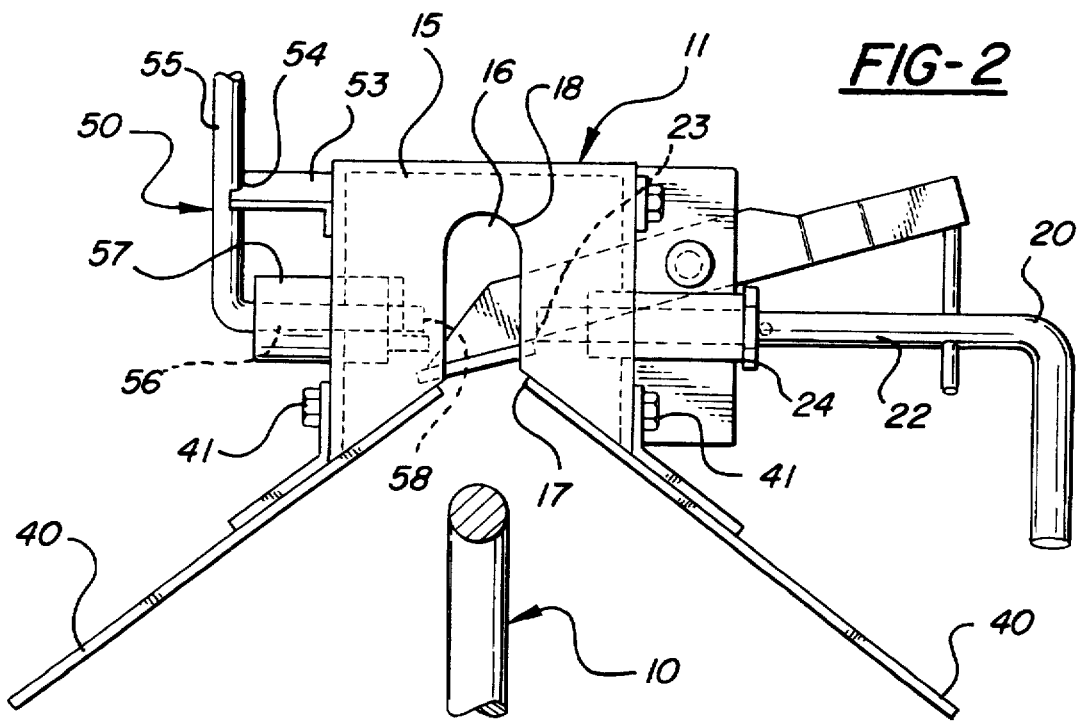
FIG. 2 is a top cross-sectional, partially cut-away view, of the component parts of the invention, with the lever bolt and male latch member in operative position.
Figure 5:
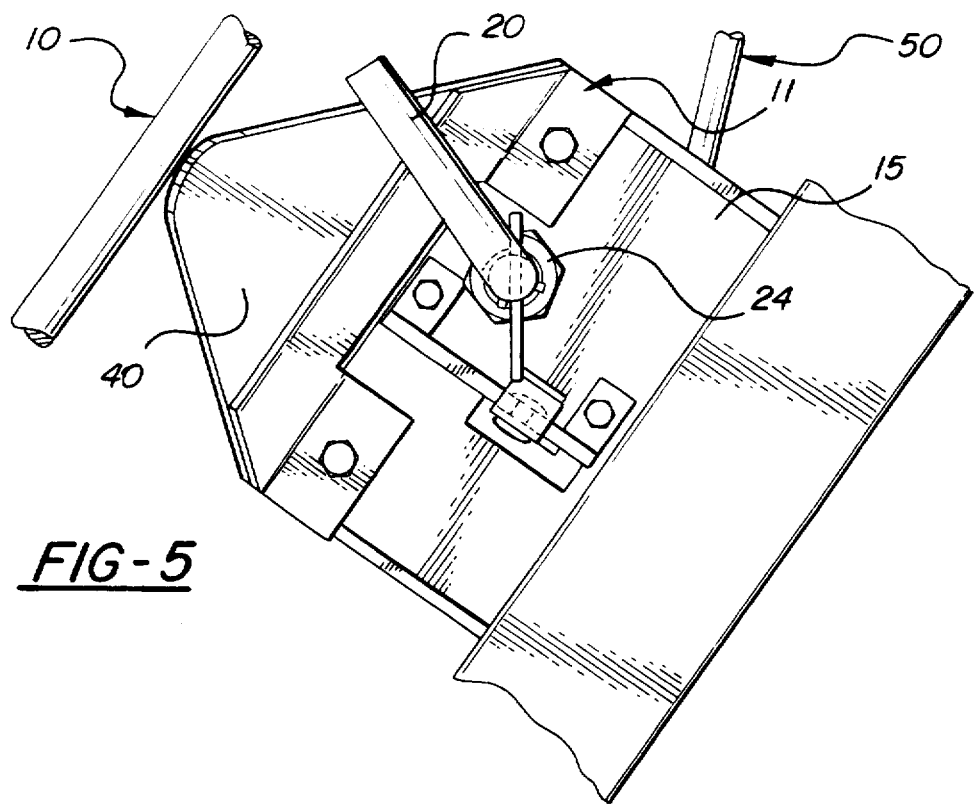
FIG. 5 is a side perspective view of the housing structure of the invention, showing the vertically extending male member and the flag structure in operative position.
Figure 6:
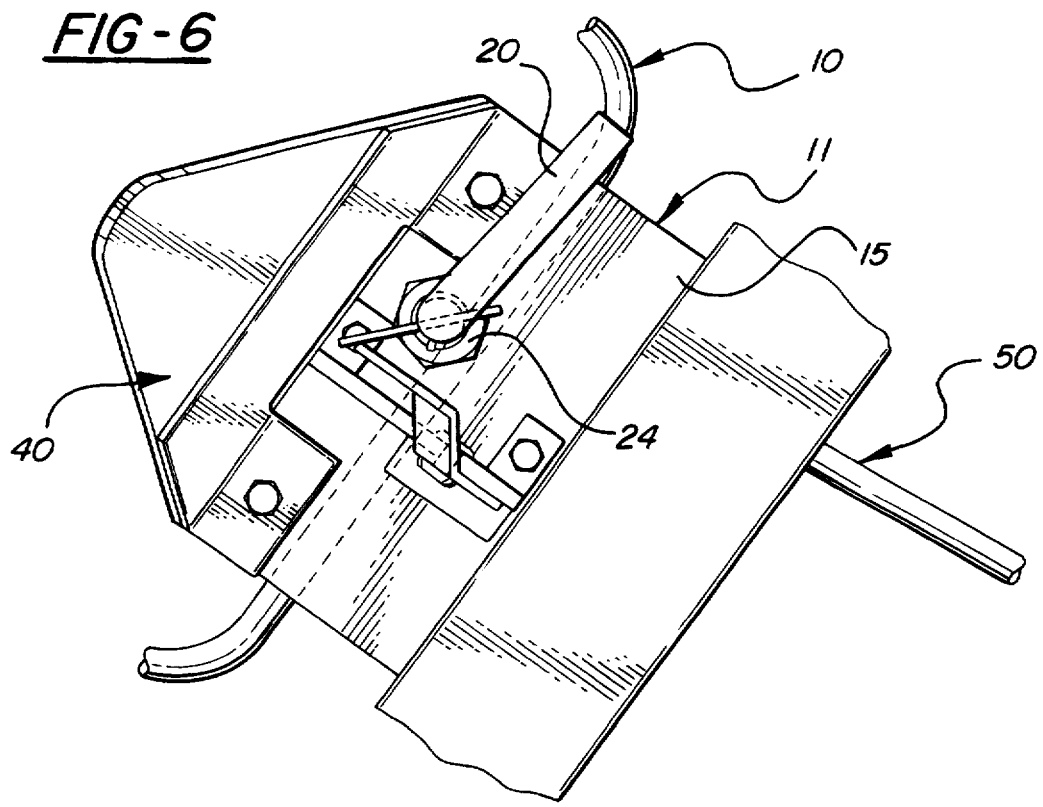
FIG. 6 is a side perspective view of the housing structure of the invention showing the vertically extending male member and the flag structure in latching position.
Figure 7:
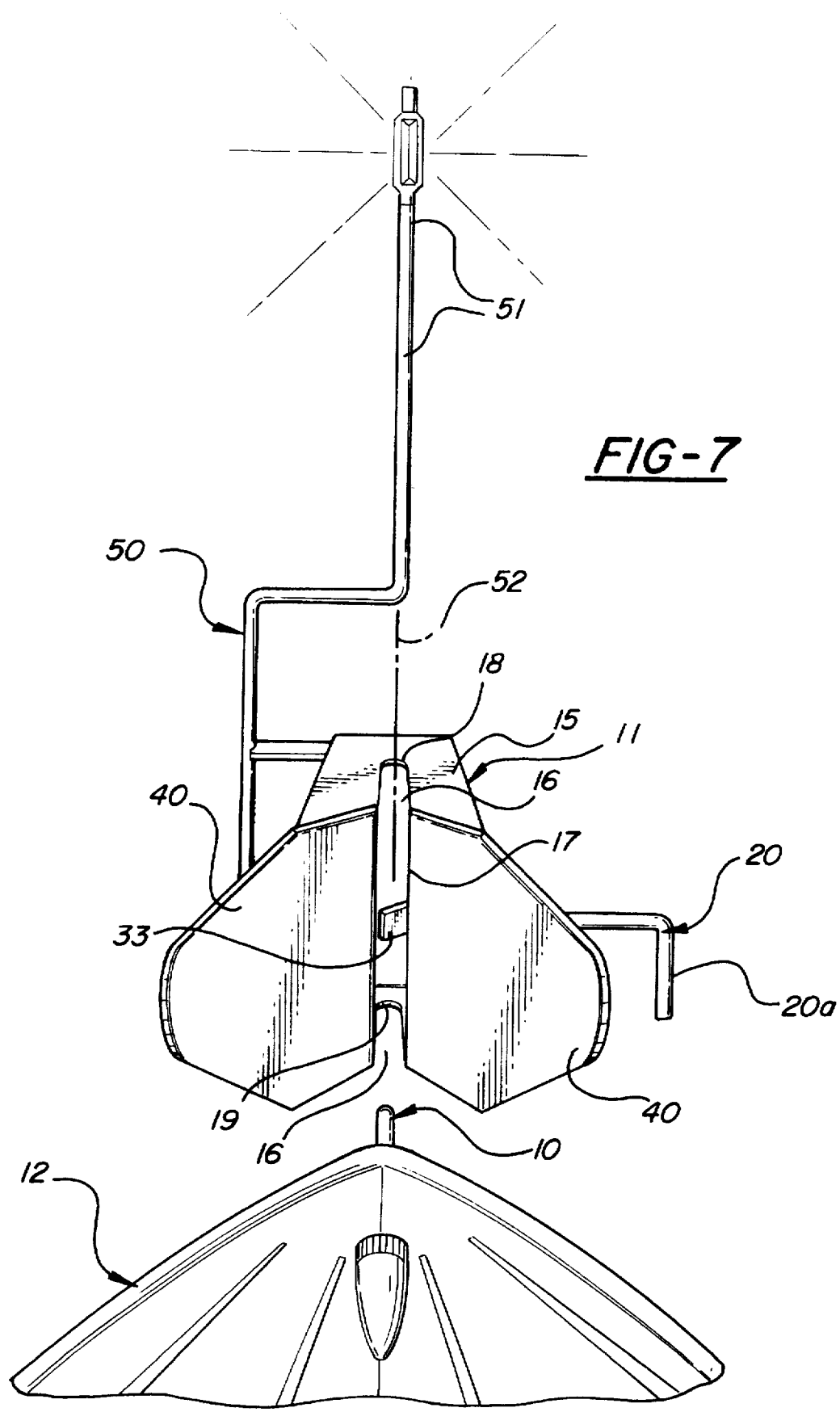
FIG. 7 is a top elevational view showing the relationship of various components of the invention in operative position.

A latch bolt 20 is mounted horizontally on the housing 15, to allow for horizontal movement 21 of the latch bolt 20 along its lengthwise axis 22 between a retracted position as shown in FIGS. 2 and 5, wherein the tip end 23 of the bolt 20 is clear of the slot 16 and a latching position as shown in FIGS. 3 and 6 in which the tip end 23 extends across the slot 16. The diameter of the bolt constitutes a minor fraction of the vertical extent of the slot as can be seen in FIGS. 1–6.

The bolt 20 is mounted on the housing by a cylindrical housing fitting 24, the interior diameter of said fitting 24 being larger in diameter than the bolt to allow rotational movement of the bolt 10 about its lengthwise axis 22.

The housing fitting 24 allows the bolt 20 to be held in retracted or first angular position as shown in FIGS. 2 and 5 and in latching or second angular position as shown in FIGS. 3 and 6.

The bolt 20 is held in the second angular or retracted position by a protruding bit 25 extending radially from the bolt 20 at right angles from its lengthwise axis, which protruding bit 25, in the retracted position, rests upon the outward face 26 of the housing fitting 24. The bolt 20 is biased towards its latching position by a spring 27 mounted around the bolt 20 contained within the housing fitting 24 and held in place by washers 28 at each end. When the bolt 20 is in its retracted position, the spring biasing means 28 is compressed against the inner side 29 of the outward face 26 of the housing fitting 24. Said housing fitting 24 has additionally in its outward face 24 a groove 30 of greater width and length than that of the protruding bit 25. When the bolt 20 is rotated to a point where the protruding bit 25 is aligned with the groove 30, the spring 27 operates to bias the bolt 20 to its latching position.

To provide a means for rotating the bolt to its first angular position in which it is free to move to its latching position, a lever 31 is pivotally mounted by means of a vertically extending rod 32 mounted on the housing 15. The first end 33 of the lever 31 is positioned in the slot 16 proximate to the bolt 20. The second end 34 is positioned proximate to the outward or handle end 20a of the bolt 20. The outward or handle end 20a of the bolt 20 additionally has a protruding crank arm 35 extending radially from the outward or handle end 20a of the bolt 20.

The automatic latching feature of the invention is activated when the latch bar 10 strikes the first end 33 of the lever 31, causing it to rotate about its axis 32 and further causing the second end 34 to strike the crank arm 35, in turn causing rotation of the bolt 20 until the bit 25 becomes aligned with groove 30, whereupon the biasing spring 27 expands, forcing the tip end 23 of the bolt 20 to extend across the slot 16 placing the bolt 20 in its latching position, rearward of the latch bar 10, as shown in FIGS. 3 and 6.

It will be seen that a funnel means to guide the latch bar 10 into the slot 16 has been provided, by two ramp plates 40. Said ramp plates extend rearwardly and diverge outwardly from slot 16. In doing so, they provide a wide mouth target for the latch bar 10 and serve to guide or direct said latch bar into the slot 16. The ramp plates 40 are affixed to the housing 15 by bolt fasteners 41.

The funnel means provided by the ramp plates serves to act as a guide for directing the latch bar 10 into the receiving slot 16. In addition it serves to help align the boat vertically by contacting the latch bar along its vertical extension.

Additionally, in order to provide a visual locator for the operator, in the preferred embodiment of the invention, the housing 15 defines a target for the latch member 10. To emphasis and make more visible such target, a flag structure 50 is mounted on the housing 15. Said flag structure 50 is mounted for movement between an operative position as shown in FIGS. 1, 2, 5 and 7, wherein the flag portion 51 of the flag structure extends above the housing 15 in vertical alignment 52 with the target slot 16, and a retracted position as partially shown in FIGS. 3 and 6. Said flag structure 50, in the preferred embodiment, further includes a light 60 positioned over the flag structure 50 and in vertical alignment 52 with the target slot 16. It will be seen that the light feature permits utilization of the target structure in darkness as well as light.

The flag structure 50 is held in its operative position by a planar member 53 affixed to the housing 15, extending outwardly from the housing 15 in a horizontal manner and having a concave end 54 in which the upward member 55 of the flag structure 50 rests in its operative position.

The flag structure includes a shaft portion 56 mounted on the housing 15 by means of a cylindrical housing fitting 57.

The housing fitting 57 allows the shaft portion 56 to move along a horizontal axis aligned with the lengthwise axis 22 of the bolt 20. It is positioned with an inboard free end 58 thereof in confronting relationship to an inboard free end 23 of the bolt 20. The housing fitting 57 has an interior diameter large in diameter than the shaft portion 56 to allow rotational movement of the shaft position 56 about its lengthwise access 22. Upon the bolt 20 reaching its latching position, its inboard free end 23 strikes the inboard free end 58 and drives the shaft portion 56 outward from the housing 15. Such outward movement disassociates the upward member 55 of the flag structure 50 from planar member 53, allowing the entire flag structure to rotate about the lengthwise axis 22 of shaft portion 56. The weight of the flag structure causes the flag portion 51 to rotate downward and out of sight, signally that the bolt 20 has reached its latching position.

WHEREAS a preferred embodiment of the invention has been illustrated and described in detail, it will be apparent that various changes may be made in the disclosed embodiment, without departing from the spirit of the invention.

I claim:

1. A latch assembly for latching a boat to a boat trailer, the latch assembly comprising:

a latch bar adapted to be secured to the prow of the boat and including an elongated generally vertically extending latch bar portion spaced forwardly from the prow; and a latch structure adapted to be mounted on the forward end of the boat trailer and including a housing having rear, upper and lower faces defining a vertically extending slot opening in rear, upper, and lower faces of the housing and sized to receive the latch bar portion therein, a bolt mounted on the housing for horizontal movement along the lengthwise axis of the bolt between a retracted position clear of the slot and a latching position extending across the slot, means for retaining the bolt in its retracted position, and trigger means operative in response to movement of the latch bar portion into the slot to move the bolt from its retracted position to its latching position, and the bolt is further mounted for rotational movement about its lengthwise axis between a first angular position in which the bolt is free to move along its lengthwise axis to its latching position and a second angular position in which the bolt is precluded from moving to its latching position;

the means for retaining the bolt in its retracted position includes means retaining the bolt in said second angular position; and, the trigger means is operative to move the bolt from its second angular position to its first angular position.

2. A latch assembly according to claim 1 wherein:

the trigger means comprises a lever mounted on the housing and having a first end positioned in the slot proximate the bolt and a second end operative in response to engagement of the first end by the latch bar portion to rotate the bolt from its second angular position to its first angular position.

3. A latch assembly for latching a boat to a boat trailer, the latch assembly comprising:

a latch bar adapted to be secured to the prow of the boat and including an elongated, generally vertically extending latch bar portion spaced forwardly from the prow; and a latch structure adapted be mounted on the forward end of the boat trailer and including a housing having rear, upper and lower faces defining a vertically extending slot opening in rear, upper and lower faces of the housing, Said slot proximately sized to receive the diameter of the latch bar portion therein, a bolt mounted on the housing for horizontal movement along the lengthwise axis of the bolt between a retracted position clear of the slot and a latching position extending across the slot, means for retaining the bolt in its retracted position, and trigger means operative in response to movement of the latch bar portion into the slot to move the bolt from its retracted position to its latching position, and said latch structure further includes funnel means extending rearwardly from said slot operative to contact said latch bar along its vertically extending portion and to direct said latch bar portion into said slot, and to align said boat vertically, which funnel means comprises ramp plates extending rearwardly from said slot and diverging rearwardly so as to provide a wide mouth target for the latch bar portion, and the vertical extent of the elongated vertically extending latch bar portion being at least as great as the vertical extent of the slot, and the diameter of the bolt being a minor fraction of the vertical extent of the slot, the latch structure includes a flag structure mounted on the housing for movement between an operative position, in which a flag portion of the flag structure extends above the housing in vertical alignment with the slot to provide a visual locator for the slot, and a retracted position.

4. A latch assembly according to claim 3 wherein:

the flag structure is moved from its operative position to its retracted position in response to movement of the bolt to its latching position.

5. A latch assembly for latching a boat to a boat trailer, the latch assembly comprising:

a latch bar adapted to be secured to the prow of the boat and including an elongated generally vertically extending latch bar portion spaced forwardly from the prow; and a latch structure adapted to be mounted on the forward end of the boat trailer and including a housing having rear, upper and lower faces defining a vertically extending slot opening in rear, upper, and lower faces of the housing and sized to receive the latch bar portion therein, a bolt mounted on the housing for horizontal movement along the lengthwise axis of the bolt between a retracted position clear of the slot and a latching position extending across the slot, means for retaining the bolt in its retracted position, and trigger means operative in response to movement of the latch bar portion into the slot to move the bolt from its retracted position to its latching position;

the latch structure includes a flag structure mounted on the housing for movement between an operative position, in which a flag portion of the flag structure extends above the housing in vertical alignment with the slot to provide a visual locator for the slot, and a retracted position, the flag structure is moved from its operative position to its retracted position in response to movement of the bolt to its latching position, and the flag structure includes a shaft portion mounted on the housing for movement along a horizontal axis aligned with the lengthwise axis of the bolt and positioned with an inboard free end thereof in confronting relation to an inboard free end of the bolt, the flag structure shaft portion being arranged to be struck by the bolt upon movement of the bolt to its latching position and the striking of the flag structure shaft portion being operative to move the flag structure to its retracted position.

6. A latch assembly for latching a boat to a boat trailer, the latch assembly comprising:

a latch bar adapted to be secured to the prow of the boat and including an elongated generally vertically extending latch bar portion spaced forwardly from the prow; and a latch structure adapted to be mounted on the forward end of the boat trailer and including a housing having rear, upper and lower faces defining a vertically extending slot opening in rear, upper, and lower faces of the housing and sized to receive the latch bar portion therein, a bolt mounted on the housing for horizontal movement along the lengthwise axis of the bolt between a retracted position clear of the slot and a latching position extending across the slot, means for retaining the bolt in its retracted position, and trigger means operative in response to movement of the latch bar portion into the slot to move the bolt from its retracted position to its latching position, the latch structure includes a flag structure mounted on the housing for movement between an operative position, in which a flag portion of the flag structure extends above the housing in vertical alignment with the slot to provide a visual locator for the slot, and a retracted position, and the flag structure further includes a light positioned on the flag portion of the flag structure so as to provide a light positioned over and in alignment with the slot with the flag structure in its operative position.

7. A latch assembly for latching a boat to a boat trailer, the assembly comprising:

a latch bar adapted to be secured to the prow of the boat and including an elongated generally vertically extending latch bar portion spaced forwardly of the prow;

a latch structure adapted to be mounted on the forward end of the boat trailer and including;

a housing having rear, upper and lower faces defining a vertically extending slot opening in rear, upper, and lower faces of the housing and sized to receive the latch bar portion therein;

a bolt having a tip end and a handle end;

means mounting the bolt on the housing for horizontal movement along the lengthwise axis of the bolt between a retracted position in which the tip end is clear of the slot and a latching position in which the tip end extends across the slot;

means mounting the bolt on the housing for rotational movement about its lengthwise axis between a first angular position in which the bolt is free to move to its latching position and a second angular position in which the bolt is precluded from moving to its latching position;

means for retaining the bolt in its second angular position;

means biasing the bolt toward its latching position;

a lever pivotally mounted on the housing and including a first end, positioned in the slot proximate the bolt in a position where said first end is engaged by the latch bar portion to pivot the lever, and a second end positioned proximate the handle end of the bolt; and means operative in response to pivotal movement of the lever to move the bolt to its first angular position and allow the bolt to move to its latching position under the urging of the biasing means.

8. A latch assembly according to claim 7 wherein:

the lever is mounted for movement about a generally vertical axis; and the means operative to move the bolt to its first angular position in response to pivotal movement of the lever comprises a crank arm extending radially from the handle end of the bolt and engaged by the second end of the lever.

* * * * *